United States Patent [19]

Gronow

[11] Patent Number: 4,785,741
[45] Date of Patent: Nov. 22, 1988

[54] EMERGENCY EXIT IN VEHICLES, PARTICULARLY IN AIRCRAFT AND SPACECRAFT

[75] Inventor: Werner Gronow, Blagnac, France

[73] Assignee: Deutsche Airbus GmbH, Munich, Fed. Rep. of Germany

[21] Appl. No.: 94,330

[22] Filed: Sep. 8, 1987

[30] Foreign Application Priority Data

Sep. 22, 1986 [DE] Fed. Rep. of Germany ....... 3632122

[51] Int. Cl.$^4$ .......................... B60N 5/00; B61D 1/00
[52] U.S. Cl. ...................................... 105/348; 49/141; 49/465; 105/377; 244/129.5; 296/148
[58] Field of Search .................. 49/141, 463, 465; 105/348, 377; 244/129.4, 129.5, 905; 296/146, 148

[56] References Cited

U.S. PATENT DOCUMENTS

| | | | |
|---|---|---|---|
| 2,453,937 | 11/1948 | Ray | 244/129.5 |
| 2,797,884 | 7/1957 | Peed, Jr. | 244/129.5 |
| 4,111,472 | 9/1978 | Smith et al. | 49/141 |
| 4,304,070 | 12/1981 | Musacchia | 49/141 |

FOREIGN PATENT DOCUMENTS

758023 5/1943 Fed. Rep. of Germany .

Primary Examiner—Ronald C. Capossella
Attorney, Agent, or Firm—Toren, McGeady & Associates

[57] ABSTRACT

An emergency exit in vehicles, particularly aircraft or spacecraft. The vehicle wall defines an emergency exit opening. A door is sealingly placed against and lockable with the vehicle wall. The door can be moved outwardly through the opening for completely opening the emergency exit.

10 Claims, 3 Drawing Sheets

U.S. Patent  Nov. 22, 1988  Sheet 1 of 3  4,785,741
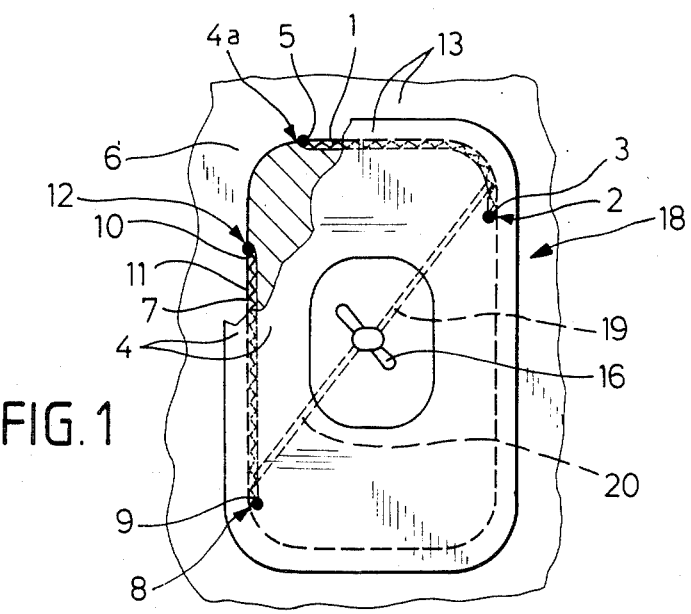
FIG. 1
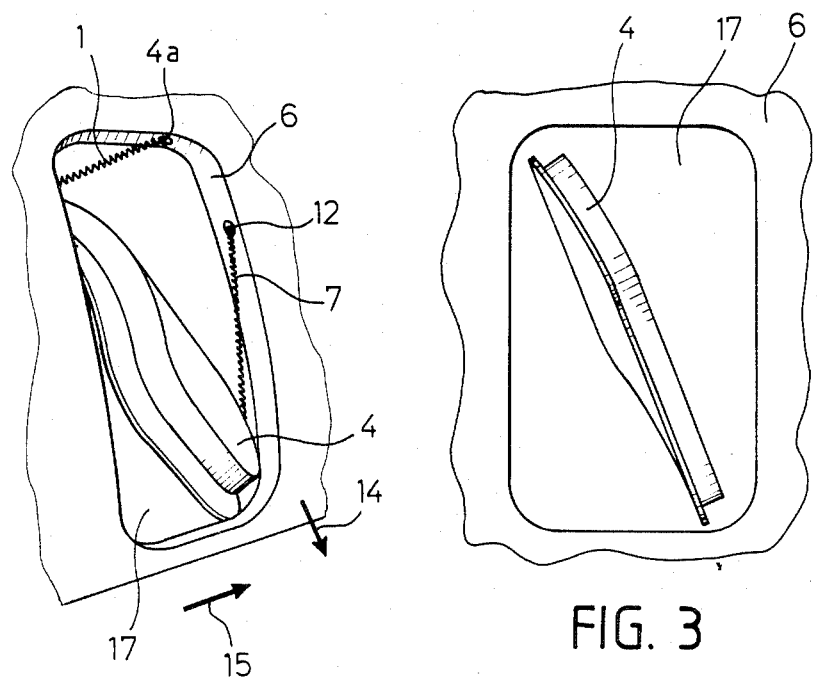
FIG. 2
FIG. 3

EMERGENCY EXIT IN VEHICLES, PARTICULARLY IN AIRCRAFT AND SPACECRAFT

BACKGROUND OF THE INVENTION

1. Field of the Invention

The present invention relates to an emergency exit in vehicles, particularly in aircraft and spacecraft. The emergency exit includes a door and an opening formed in a wall of the vehicle. The door is placed sealingly against and is lockable with the vehicle wall. The door can be moved outwardly through the opening for completely opening the emergency exit.

2. Description of the Prior Art

Emergency exits of the above-described type are used predominantly in aircraft in civil aviation. However, they are increasingly also used in passenger cars of railroads.

Particularly in aircraft, these emergency exits must meet very rigid requirements. Due to the relatively high internal pressure in the aircraft body, the doors of the emergency exits must close absolutely tightly and, thus, the doors must be constructed appropriately stable and heavy and must be capable of being rigidly connected in a positively locking manner to the wall of the vehicle or aircraft. In addition, a frictional engagement between door and vehicle wall may be necessary. On the other hand, in case of emergency, it must be possible to open the emergency exit very quickly and without the application of force. In other words, any of the passengers sitting closest to the emergency exit must be capable of opening the emergency exit without requiring the application of great forces or the carrying out of substantial manipulations. Accordingly, even a physically weak person must be able to open the emergency exit, so that he or she and the remaining passengers can freely reach the outside from the aircraft. The above-described requirements must be met even though emergency exit doors are subject to the same requirements with respect to tightness and strength as are normal exit doors and windows in aircraft.

German Pat. No. 758,023, for example, describes a transparent pane support in vehicles, particularly in aircraft, in which, in case of danger, the pane is released by pulling out an elastic intermediate layer, so that a possibility for the passengers to climb through the window opening is provided.

In this prior art arrangement, the passengers must apply a great force in separating the pane from the support or for separating the support together with the pane from the frame in the aircraft wall. This great force cannot be applied, for example, by children or older passengers. In addition, this force can only be applied by the passenger in a standing position, and parallel to the length of his arm. This has the disadvantage that, since a person opening the emergency exit must stand in front of the aircraft wall, a larger space must be provided between the rows of the seats in flying direction. This greater space is very expensive for the airlines.

In addition, in the prior art arrangement, it is not insured that the pane will fall outwardly with certainty and without requiring time consuming manipulations by the passengers, so that the window opening and the space between the seat rows are not blocked for the following passengers. This problem is particularly serious if the pane or door is greater at all sides than the emergency exit opening for tightness reasons and rests against the inner surface of the wall under the pressure of the interior of the aircraft body.

It is, therefore, the primary object of the present invention to improve the emergency exit of the type described above in such a way that the above-described disadvantages are avoided. Specifically, an emergency exit is to be provided which can always be opened safely and quickly in a manner which requires very little force and no difficulties in manipulation.

SUMMARY OF THE INVENTION

In accordance with the present invention, a first pretensionable expanding element is connected with one end to the door near an upper corner thereof and is releasably attached with its other end to the vehicle wall at a point located approximately diagonally upwardly opposite this upper corner. A second pretensionable expanding element is attached with its one end to the door at a lower corner thereof located approximately diagonally opposite the upper corner and is releasably attached with its other end to the vehicle wall on the longitudinal side thereof extending upwardly from the lower corner at a location approximately within the upper quarter of the length of the longitudinal side of the door. Thus, the second element extends upwardly parallel to the longitudinal side of the door.

The particular advantages of the emergency exit according to the present invention reside in that any aircraft passenger can carry out the complete opening procedure for emergency exiting to its conclusion, without requiring any force and while being in the seated position and without requiring additional space between the seats. In addition, the door is automatically pushed outwardly, so that no manipulations have to be carried out under time pressure which could make it difficult for the passengers to exit successfully.

Since the door always falls outwardly, the door will not lie on the floor or a seat or obstruct the emergency exit opening which would obstruct or delay the quick exit of the passengers in a life threatening manner. In addition, the door may be of greater weight and of more stable construction to obtain high strength and tightness. Moreover, the door may be of greater size on all of its sides than the emergency exit opening.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 1 is a schematic front elevational view of the emergency exit according to the present invention, seen from the inside of the aircraft;

FIG. 2 is a perspective view of the emergency exit, seen from the outside with the door carrying out a rotating movement;

FIG. 3 is a schematic front elevational view of the emergency exit, with the door shown in the ejection position after the rotating movement thereof has been concluded.

DETAILED DESCRIPTION OF THE INVENTION

Figure 4:
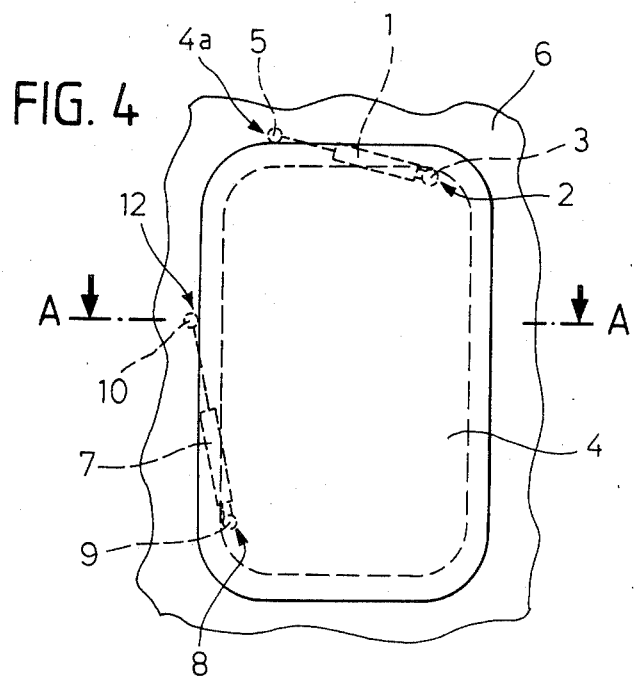
FIG. 4 is a schematic front elevational view of another embodiment of the emergency exit according to the present invention.

In FIG. 1 of the drawing, the emergency exit 18 is illustrated in a vehicle or aircraft in the way it is seen from the interior of the aircraft by a passenger. The emergency exit 18 is arranged always between the rows of seats, not shown, so that the emergency exit 18 is accessible to passengers. Emergency exit 18 includes a door 4 which can be separated completely from the vehicle or aircraft wall 6. To avoid any problems concerning tightness, etc., door 4 is of greater size on all sides than the emergency exit opening 17 provided in the aircraft wall 6. In other words, door 4 is of such a size that it overlaps the opening 17, as illustrated in FIG. 1 at reference numeral 4.

Since, as described above, the door 4 must absolutely be moved outwardly in case of danger, as schematically shown by arrow 14, pretensionable expanding elements 1, 7 are provided on door 4. A conventional locking mechanism 16 capable of being easily opened by a passenger is provided on door 4. The expanding elements 1, 7 are mounted on the emergency exit 18 in such a way that, after the locking mechanism 16 has been unlocked, the expanding elements 1, 7 automatically impart to door 4 a tilting and rotating movement particularly about the vertical axis, as schematically shown in FIG. 2, until door 4 reaches approximately a diagonal position of its transverse axis in the emergency exit opening 17, as illustrated in FIG. 3, in which the door 4 is completely separated from wall 6.

The door 4 may be pushed or fall outwardly as shown by arrow 14 against, for example, the flying direction as indicated by arrow 15 as a result of the acceleration forces generated during the rotating movement of the door or as a result of its own weight above its center of gravity or as a result of the passengers slightly pushing against the door. If the airplane is still in motion, the airflow on the outside may additionally aid the rotating movement of the door.

For obtaining the tilting and rotating movement of the door 4, a pretensionable expanding element 1 is attached with its one end 2 to the door 4 near the upper corner 3 thereof and with the other end 5 to the aircraft wall 6 at a point 4a located approximately diagonally upwardly opposite corner 3. Another pretensionable expanding element 7 is attached to the door 4 with its one end 8 near a lower corner 9 located approximately diagonally opposite upper corner 3 and with its other end 10 to the aircraft wall 6 at a point approximately within the upper fourth 12 of the length of the door so that the element 7 extends upwardly approximately parallel to the longitudinal edge 11 of door 4.

The fastening means for attaching the expanding elements 1, 7 are conventional fastening elements and do not form part of the invention. These fastening elements release the expanding elements 1, 7 after the fastening elements have been rotated to a certain extent. Different types of hooks are such fastening elements. It is advantageous if the expanding elements 1, 7 are releasable from their fastenings from the interior of the aircraft, so that, after the door 4 has been pushed out, the expanding elements 1, 7 can also reach the outside 14 together with the door 4, without forming an obstruction to the passengers.

Figure 5:
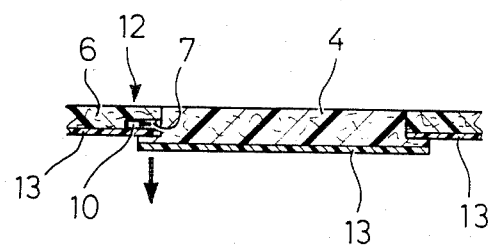
FIG. 5 is a partial sectional view taken along sectional line A—A of FIG. 4.

The expanding elements 1, 7 can be mounted in the untensioned or in the pretensioned state. For reasons of safety and for optical reasons, the expanding elements 1, 7 are mounted under the lining 13 for the door and/or aircraft wall, as shown in FIG. 5. When the expanding elements 1, 7 are activated, i.e., when they perform a pulling action, the expanding elements 1, 7 are torn out of the lining or are separated therefrom in some other manner.

For safety reasons, it is also conceivable to pretension the expanding elements 1, 7 only shortly before the door 4 is pushed out, by actuating the locking mechanism 16 to unlock the door 4. For example, the expanding elements 1, 7, which are spring or rubber bands, may be pretensioned by a distance shortening or distance extension by means of levers 19, 20 which are arranged on the locking mechanism 16 and are movable and lockable by mechanism 16. The distance extension is effected, for example, by a counter-clockwise rotation of the locking mechanism 16, so that the distance of the levers 19, 20 rotating together with the mechanism 16 is extended relative to expanding elements 1, 7. In other words the levers are acted on eccentrically. As a result, the elements 1, 7 are tensioned by a direct action of known means.

Figure 6:
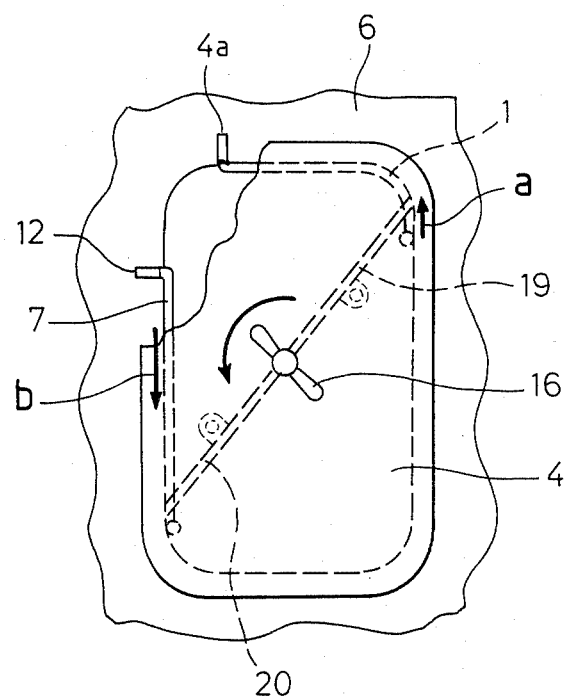
FIG. 6 is a schematic front elevational view of another embodiment of the present invention.

The pretensionable expanding elements may be composed of hydraulically or pneumatically pretensionable pistons in cylinders, as illustrated in FIG. 4. In this case, the pistons can be tensioned by means of levers 19, 20. Locking of the levers 19, 20 in the end position thereof for maintaining the force application on the expanding elements 1, 7 can be carried out, for example, by means of spring-biased bolts which engage levers 19, 20, as shown in FIG. 6. Arrows a and b indicate the direction of tensional forces which act when the locking mechanism 16 is turned in counterclockwise direction.

As illustrated in FIG. 1, expanding elements 1, 7 are arranged so as to extend approximately along the contour of door 4. However, expanding elements 1, 7 may also be arranged on emergency exit 18 in different ways not illustrated in the drawing. The scope of the invention is not limited by the different type of actuating means and their locations relative to the emergency exit 18, because the automatic movement of door 4 with its longitudinal access into a vertical position and with its transverse axis into a diagonal position relative to the emergency exit opening 17 are the deciding aspects of the ejection of the door 4.

While the specific embodiments of the invention have been shown and described in detail to illustrate the application of the inventive principles, it will be understood that the invention will be embodied otherwise without departing from such principles.

I claim:

1. An emergency exit in vehicles, particularly in aircraft or spacecraft, wherein a wall of the vehicle defines an emergency exit opening, a door sealingly placable against and lockable with the vehicle wall, the door capable of being moved outwardly through the opening for completely opening the emergency exit, the opening and the door defining first and second longitudinal sides and a top side, and an upper corner at the top of the second side and a diagonally oppositely located lower corner at the bottom of the first side, the improvement comprising first and second pretensionable expanding elements each having first and second ends, the first end of the first element attached to the door on the second longitudinal side near the upper corner and the second end releasably attached to the vehicle wall at a point located on the top side approximately diagonally upwardly across the upper corner, the first end of the second expanding element attached to the door on the first longitudinal side near the lower corner and the second end releasably connected to the vehicle wall at a point on the first longitudinal side approximately one-fourth from the top side, so that the second expanding element extends essentially parallel to the first longitudinal side.

2. The emergency exit according to claim 1, wherein the pretensionable expanding elements are springs.

3. The emergency exit according to claim 1, wherein the pretensionable expanding elements are of an elastomeric material.

4. The emergency exit according to claim 3, wherein the elastomeric material is rubber.

5. The emergency exit according to claim 1, wherein the pretensionable expanding elements are hydraulically or pneumatically pretensionable pistons in cylinders.

6. The emergency exit according to claim 1, wherein the expanding elements are arranged in the door.

7. The emergency exit according to claim 1, wherein the expanding elements are arranged in the vehicle wall.

8. The emergency exit according to claim 1, wherein the expanding elements are arranged partially in the door and partially in the vehicle wall.

9. The emergency exit according to claim 1, wherein the expanding elements are arranged in the door or in the vehicle wall covered by a lining, the lining being torn open when the expanding elements are activated.

10. The emergency exit according to claim 1, the door including a locking mechanism, further comprising means for tensioning the expanding elements shortly before the ejection of the door, the means including levers arranged at and lockable by the locking mechanism.

* * * * *